UNITED STATES PATENT OFFICE.

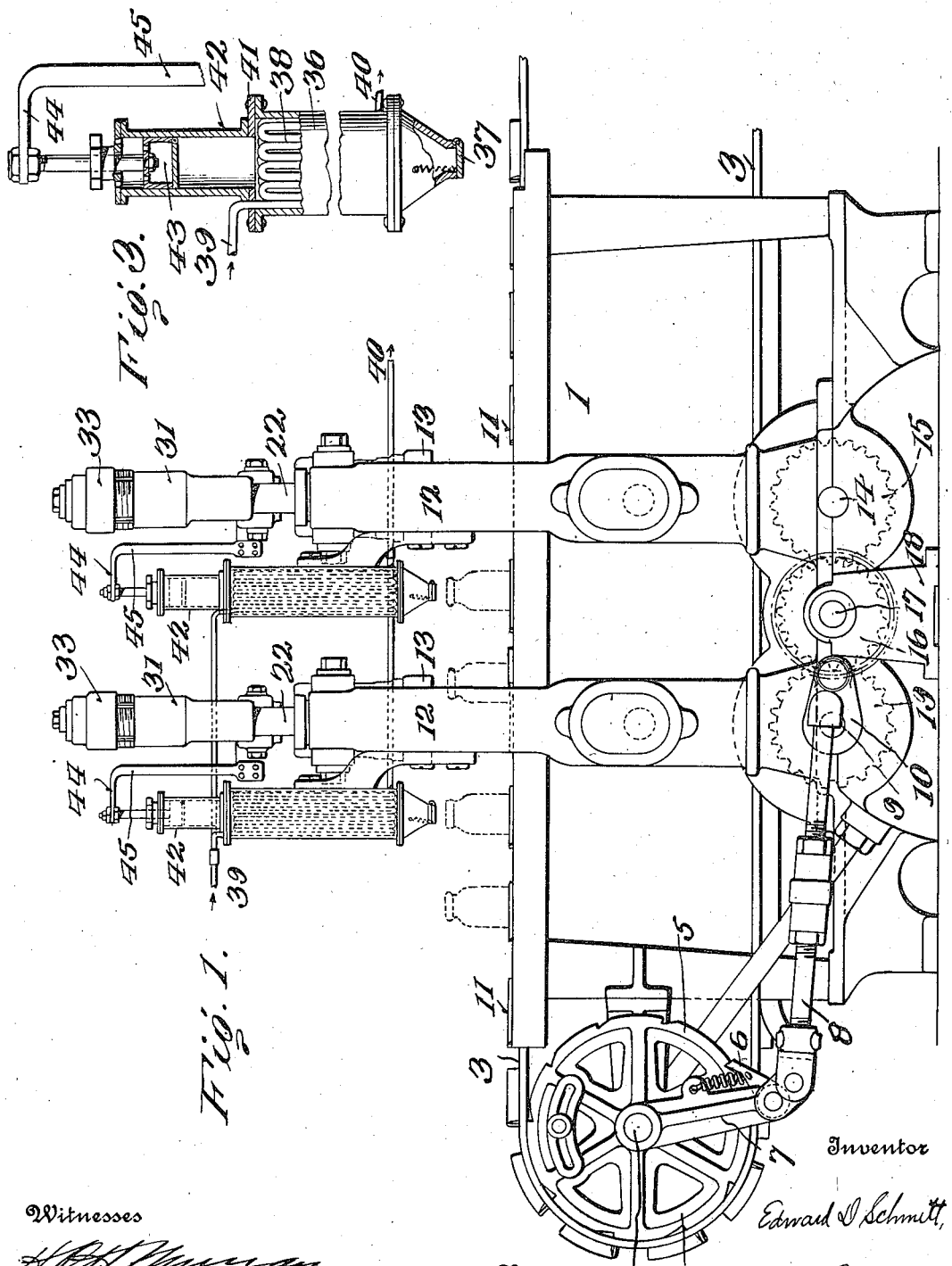

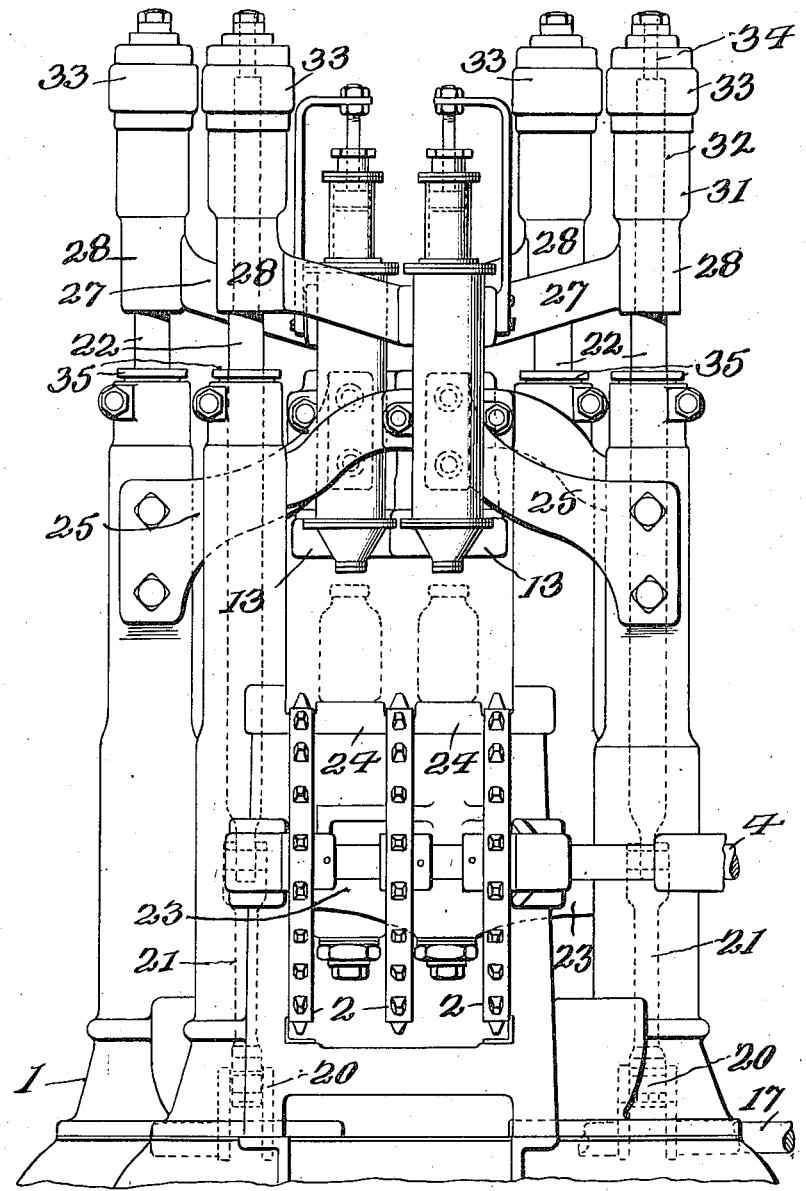

EDWARD D. SCHMITT, OF BALTIMORE, MARYLAND, ASSIGNOR, BY MESNE ASSIGNMENTS, TO THE AMERICAN PURE FOOD PROCESS COMPANY, OF BALTIMORE, MARYLAND, A CORPORATION OF DELAWARE.

PROCESS OF PRESERVING FOOD PRODUCTS.

1,191,839.     Specification of Letters Patent.     Patented July 18, 1916.

Application filed August 27, 1913. Serial No. 786,940.

*To all whom it may concern:*

Be it known that I, EDWARD D. SCHMITT, a citizen of the United States, residing at Baltimore, in the State of Maryland, have invented certain new and useful Improvements in Processes of Preserving Food Products, of which the following is a specification.

The invention relates generally to preserving food-products, but more particularly to a method of sterilizing certain prepared or partially prepared food-products, such as jellies, preserves, meats, etc., prior to capping or sealing; and it has for its principal object to provide against the formation of mold upon such products in sealed jars.

Other objects will become apparent upon a complete disclosure of the invention.
In carrying out my invention, I employ certain mechanism which is attached to the sealing device of a capping machine, such as is described and shown in an application filed by me April 18, 1913, Serial No. 762,148.

In the drawing, Figure 1 is a side elevation of a capping machine to which the mechanism for sterilizing the food-products prior to sealing or capping, is attached.
Fig. 2 is an end elevation, partly in section, looking in the direction of the arrow, Fig. 1, the conveyer being omitted, and Fig. 3 is a side elevation of the heating cylinder and pump, partly in section.

Referring to the several views, the numeral 1 indicates the main frame of the machine which is provided at one end with a number of sprocket-wheels 2, over which runs a conveyer 3. Attached to the outer end of the shaft 4, on which the sprocket-wheels are mounted, is a toothed wheel 5 which is engaged by a pawl 6 carried by a rocker-arm 7 loose upon the shaft 4, whereby the conveyer is moved with a step-by-step movement, the movement of the arm 7 being dependent upon an adjustable rod 8 connected with a crank 9 on the outer end of a transverse shaft 10 journaled in the frame. The conveyer is provided, at intervals, with a series of transverse bars 11, which engage the jars and move them along with a step-by-step movement, and the movement is so timed that the conveyer will be stopped at intervals, so as to permit the jars to remain stationary a sufficient length of time to permit the sealing operation to be effected.

The numeral 12 indicates four hollow columns, two, arranged on each side of the frame, preferably in staggered form as shown in Fig. 2, so that the sealing-heads 13, supported between the columns, will be in a direct vertical line above the jar-supports 11, and they and the mechanism carried by them are duplicated.

Suitably mounted in the frame, and parallel with the shaft 10, is a shaft 14, which has keyed thereto a gear-wheel 15 meshing with a gear-wheel 16 mounted on a shaft 17 supported in standards 18. The gear-wheel 16 meshes with a gear-wheel 19 on shaft 17, and through gear-wheels 16, 15 and 19 motion is imparted to shafts 10 and 14. The shafts are also provided with cranks 20 within the columns, and connected with the cranks are pitman rods 21, which are connected to reciprocating-rods 22, the cranks and pitman-rods being duplicated on both sides of the frame, so that a uniform reciprocatory motion will be imparted to the sealing-heads.

Supported by laterally-extending arms 23, below the sealing-heads, are jar-supports 24 arranged one slightly in advance of the other, so as to be directly beneath the sealing-heads and directly in line with the conveyer.

The sealing-heads may be of any suitable construction, preferably that shown in the aforementioned application and pinned to the rods 22 is a lower crosshead 25 which centrally supports the outer crimping-member of the sealing-head 13, and above this cross-head 25 is an upper cross-head 27 having sleeve-ends 28, through which reciprocate the reduced ends of the pitman-rods 22. The upper cross-head 27 carries the plunger of the sealing-head, which extends into the outer crimping-member and carries the indenting or crimping fingers for crimping the cap onto the jar.

Superimposed upon the sleeves 28 are cups 31 containing coil-springs 32 surrounding the upper reduced portions of the pitman-rods. The cups are provided with screw-caps 33 having central plugs 34 therein, into which the upper ends of the pitman-rods are screwed. The tension of the springs may be varied by adjusting the caps 33, and the distance to which the cross-head may descend is regulated by the threaded bushings 35, as they serve to limit the downward movement of said crosshead.

In carrying out my invention, I prefer to employ the following described mechanism: Suitably supported directly above the conveyer, at each side thereof, is a cylinder 36 having a tapering exit end closed by a flap-valve 37. Situated within the cylinder is a circular coil of steam or hot-air pipes 38 having a supply inlet 39 and an outlet 40. The upper end of the cylinder is provided with a cap 41, and supported upon the cap is a pump 42 in communication with the interior of the cylinder 36, the pump being provided with a hollow piston 43, the outer end of which is connected by a rod 44 to a rod 45 attached to the upper cross-head, so that at each downward movement of said cross-head, the piston will be moved a corresponding distance to project or blow a small quantity or puff of hot air from the cylinder onto the top of the product contained in the passing jar. The head of the piston is perforated as is also the cap 42, so as to allow for the escape of air above the piston, which tends to reduce the suction on the upstroke of said piston, it being understood that the downward movement of the piston upon the heated air within the cylinder will cause the air, in its forced passage, to open the lower valve 37.

It will be understood that in practising my invention, the jars are filled with cooked or partially-cooked product, and as they are moved along by the traveling conveyer, and just before they reach the capping-mechanism, a puff of heated air, not hot enough to affect the product if it be jelly, will be projected down upon the contents of the jar, displacing the cold or cool air, and filling the space with heated air. This action takes place during the operation of the sealing-devices in seating and crimping the cap on the previously moving jar, and as soon as this operation is accomplished the cross-head is moved upward, causing the rods 45 and 44 to move the pump-piston upward, closing the several valves to prevent the heated air from escaping. At the instant the puff of heated air has been projected, a cap, which has been previously heated is placed upon the jar to be firmly secured thereto by the crimping device.

This invention forms an important step in the preservation of cooked or partially-cooked food-products keeping them pure and free from mold, and preventing the caps from becoming loosened and falling off, as in the case of vacuum process. By displacing the cold or cool air with heated air a thorough sterilization is effected, and no mold spores formed in the content, especially if jellies are produced, as in the case when a vacuum is created, so that the goods can be shipped to high altitudes or transported over the same without the danger of the caps becoming loosened, by reason of a disappearing vacuum, falling off and allowing the contents of the jars to leak or run out, as is frequently the case in transportation.

Having thus fully described my invention, what I claim is—

The method of preserving cooked or partially cooked food products in jars from mold, which consists in projecting heated air upon the food contents, instantly applying a cap to the jar, and then sealing the jar.

In testimony whereof I affix my signature in presence of two witnesses.

EDWARD D. SCHMITT.

Witnesses:
 James L. Crawford,
 Frank G. Brereton.